(12) United States Patent
Boyle

(10) Patent No.: US 11,304,410 B2
(45) Date of Patent: Apr. 19, 2022

(54) OYSTER FARMING APPARATUS AND METHODS

(71) Applicant: Norman Boyle, Merimbula (AU)

(72) Inventor: Norman Boyle, Merimbula (AU)

( * ) Notice: Subject to any disclaimer, the term of this patent is extended or adjusted under 35 U.S.C. 154(b) by 494 days.

(21) Appl. No.: 16/004,301

(22) Filed: Jun. 8, 2018

(65) Prior Publication Data

US 2018/0288980 A1 Oct. 11, 2018

Related U.S. Application Data

(63) Continuation of application No. PCT/AU2016/051200, filed on Dec. 7, 2016.

(51) Int. Cl.
*A01K 61/54* (2017.01)
*A01K 61/65* (2017.01)
*B63B 22/00* (2006.01)

(52) U.S. Cl.
CPC .............. *A01K 61/54* (2017.01); *A01K 61/65* (2017.01); *B63B 22/00* (2013.01); *Y02A 40/81* (2018.01)

(58) Field of Classification Search
USPC ................. 119/204–209, 221–225, 234–244, 119/417–421, 427, 455; 211/194, 12.21, 211/126.9, 126.11, 126.12, 133.5; 312/107, 108, 111; 206/6, 509, 504; 220/485, 493
See application file for complete search history.

(56) References Cited

U.S. PATENT DOCUMENTS

| | | | |
|---|---|---|---|
| 3,702,599 A | 11/1972 | Heroholzer | |
| 3,717,124 A | 2/1973 | Jacobs | |
| 3,763,808 A | 10/1973 | Smith, Sr. | |
| 3,909,971 A | 10/1975 | Wilde | |
| 3,916,833 A * | 11/1975 | Serfling | A01K 61/59 119/210 |
| 3,980,185 A * | 9/1976 | Cain | B65D 88/022 206/509 |
| 4,007,709 A * | 2/1977 | Wishner | A01K 61/59 119/210 |
| 4,192,562 A * | 3/1980 | Bishoff | A47B 87/02 211/189 |
| 4,270,488 A | 6/1981 | Kennedy | |
| 4,728,158 A * | 3/1988 | D'Elia | A47B 57/06 211/184 |
| 5,271,515 A * | 12/1993 | Berkheimer | B65D 21/023 206/503 |
| 5,564,513 A | 10/1996 | Wible et al. | |
| 7,083,061 B2 * | 8/2006 | Spindel | B65D 11/1826 217/15 |

(Continued)

FOREIGN PATENT DOCUMENTS

| | | |
|---|---|---|
| AU | 2015905085 | 11/2016 |
| CA | 2239043 A1 | 11/1999 |

(Continued)

*Primary Examiner* — Andrea M Valenti

(74) *Attorney, Agent, or Firm* — JCIP; Joseph G. Chu; Jeremy I. Maynard

(57) ABSTRACT

Disclosed herein are stackable cages for holding oysters, modular cages for holding oysters, floating platforms for deploying and retrieving oyster cages from a long line, and floats adapted to engage a plurality of oyster long lines and from which one or more oyster cages may depend.

8 Claims, 6 Drawing Sheets

(56) References Cited

U.S. PATENT DOCUMENTS

| | | | |
|---|---|---|---|
| 7,661,390 B2 * | 2/2010 | Mortensen | A01K 61/59 119/240 |
| 8,033,250 B2 | 10/2011 | Calinski | |
| 2006/0130772 A1 | 6/2006 | Mortensen | |
| 2010/0071630 A1 | 3/2010 | Borne, III et al. | |
| 2011/0120382 A1 | 5/2011 | Carlson | |
| 2014/0083365 A1 * | 3/2014 | McShane | A01K 61/54 119/234 |

FOREIGN PATENT DOCUMENTS

| | | |
|---|---|---|
| EP | 1106499 A2 | 6/2001 |
| EP | 16871820 | 10/2018 |
| ES | 2007723 A6 | 7/1989 |
| GB | 933918 * 8/1963 | ......... A47B 87/0284 |
| GB | 2305895 A | 4/1997 |
| GB | 2350995 A | 12/2000 |
| WO | WO1999037141 A1 | 7/1999 |
| WO | WO2004076303 A1 | 9/2004 |
| WO | WO2006050676 A1 | 5/2006 |
| WO | WO2006/117767 A2 | 11/2006 |
| WO | 2016064270 A1 | 4/2016 |
| WO | WO2017096424 A1 | 6/2017 |

\* cited by examiner

Figure 12
Figure 13
Figure 14
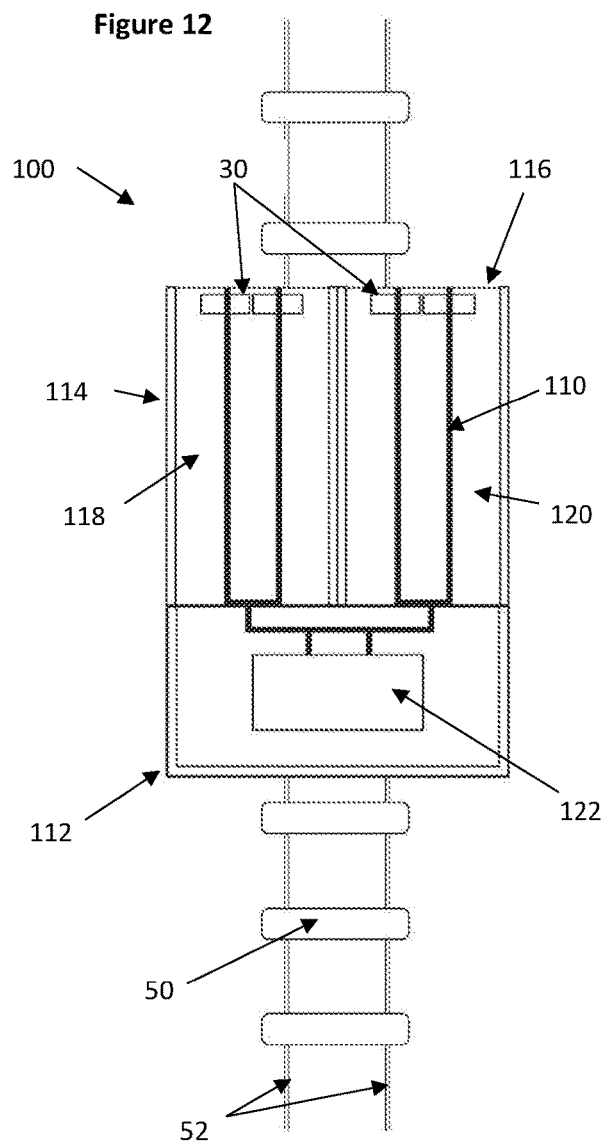
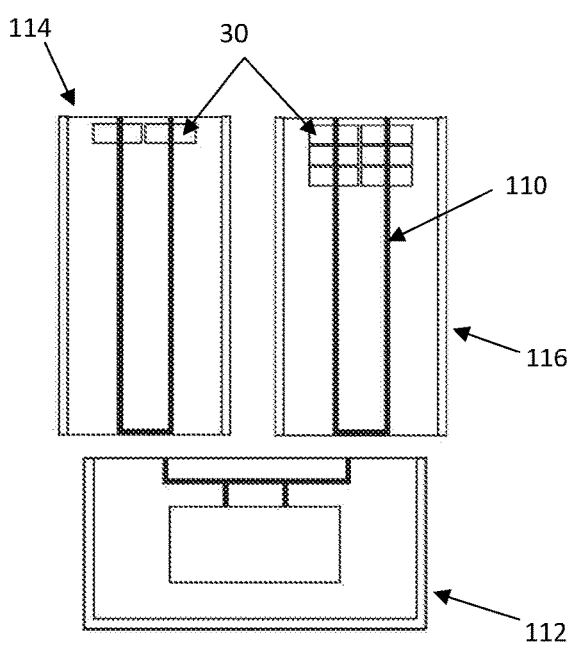
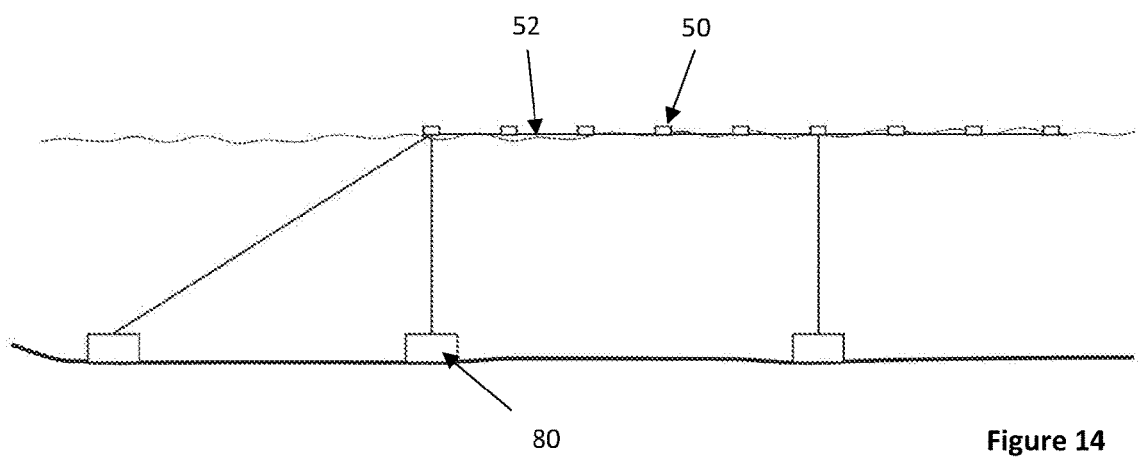

OYSTER FARMING APPARATUS AND METHODS

TECHNICAL FIELD

The present invention relates to improvements in oyster farming processes. In particular, the present invention relates to improved oyster cages, methods for deploying oyster cages and methods for collecting and returning oyster cages to the water during oyster grading or harvesting, for example.

BACKGROUND ART

Oysters are in high demand for their taste and nutritional qualities. Oysters are, high in protein, contain a range of minerals and, other nutrients (including iron, copper, zinc, magnesium, calcium, manganese, selenium and phosphorus) and are low in fats and carbohydrates. The demand for oysters continues to grow, both within Australia and around the world.

Oyster farming, however, is still somewhat of a cottage industry. While Australia has some of the best conditions for oyster farming in the world, the current industry is dominated by hundreds of small farmers. Many of these farmers have been in production for decades, using age-old processes and technology that produces a good product on a small scale. However, in order to meet the growing worldwide demand for oysters, such processes may no longer be appropriate.

It would be advantageous to improve the processes used to farm oysters such that their production may be scaled up to meet the growing worldwide demand for oysters.

SUMMARY OF INVENTION

In a first aspect, the present invention provides a floating platform for deploying and retrieving oyster cages on a long line. The floating platform comprises a first portion; a second portion that is detachably connectable to the first portion and a lifter for lifting and lowering oyster cages. A buoyancy of the first portion and a buoyancy of the second portion are independently adjustable in response to a weight distribution over the floating platform.

In a second aspect, the present invention provides a stackable cage for holding oysters. The stackable cage comprises side walls comprising apertures for allowing a flow of water therethrough, with at least one side wall being openable whilst the cage is stacked. An upper portion of the stackable cage is adapted to slidably receive an upper cage thereat, and a lower portion of the stackable cage is adapted to slidably receive a lower cage thereat.

In a third aspect, the present invention provides a modular cage for holding oysters. The modular cage comprises a plurality of cages, each of which comprises an upper portion adapted to slidably receive an upper cage thereat and a lower portion adapted to slidably receive a lower cage thereat. The modular cage also comprises a cap adapted to be slidably attached to an uppermost cage of the plurality of cages and slidably received by a float on an oyster long line. In some embodiments, each of the plurality of cages is the stackable cage of the second aspect.

In a fourth aspect, the present invention provides a float adapted to engage a plurality of oyster long lines and from which one or more oyster cages may depend. The float comprises spaced apart channels adapted to receive the plurality of long lines therein, at least one of the channels comprising a recess adapted to retain therein a bulbous portion provided on at least one of the long lines; a lower attachment from which the one or more oyster cages may depend; and an upper attachment for lifting the float from the water.

In a fifth aspect, the present invention provides methods and systems for oyster farming utilising the floating platform of the first aspect, the stackable cage of the second aspect, the modular cage of the third, aspect and/or the float of the fourth aspect. Specific embodiments of such methods and systems are described herein.

In some embodiments, the floating platform of the first aspect, the stackable cage of the second aspect, the modular cage of the third aspect and/or the float of the fourth aspect are adapted for use together. However, this need not be the case in all embodiments, and each of these components may be used independently.

BRIEF DESCRIPTION OF THE DRAWINGS

Embodiments of the present invention will be described in further detail below with reference to the accompanying drawings, in which:

FIG. 12 shows a top view of a floating platform in accordance with an embodiment of the present invention in a partially loaded state;

FIG. 13 shows a top view of a floating platform in accordance with an embodiment of the present invention in a partially loaded state and with the first and second portions detached from each other and the third portion; and FIG. 14 shows a cross sectional view of an oyster long line including a number of floats spaced therealong.

DESCRIPTION OF EMBODIMENTS

Figure 1:
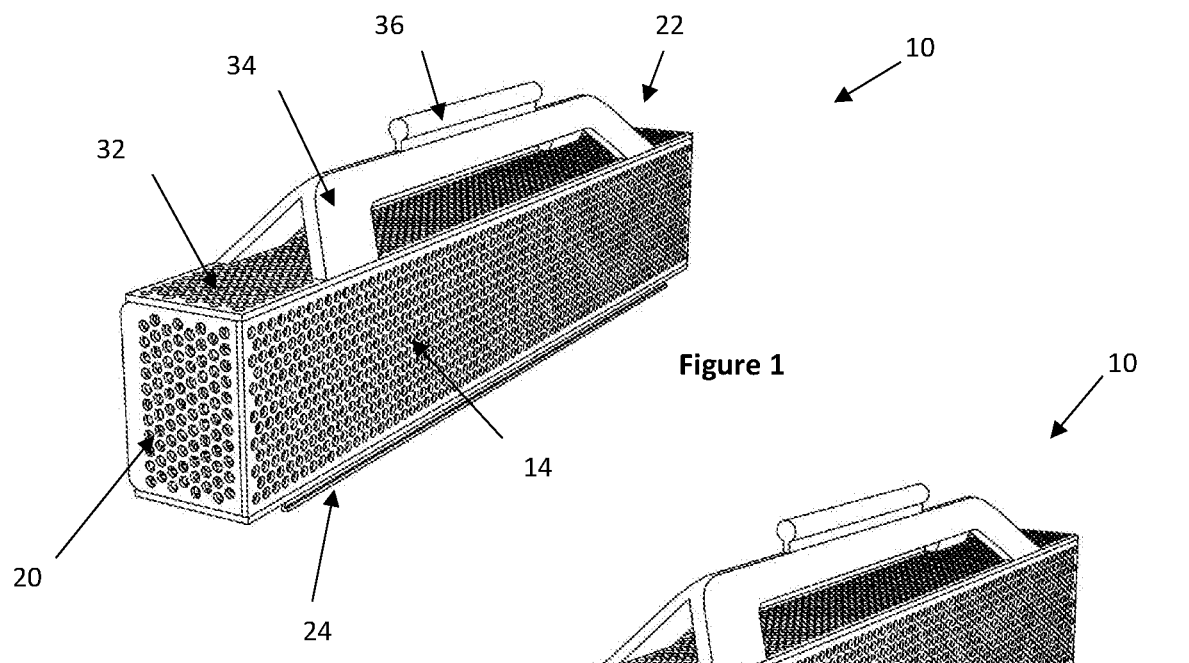
FIG. 1 shows an uppermost stackable oyster cage and cap in accordance with an embodiment of the present invention.

As described above, the present invention relates to stackable cages for holding oysters, to modular cages for holding oysters, to floats adapted to engage a plurality of oyster long lines and from which one or more oyster cages may depend, and to floating platforms for deploying and retrieving oyster cages on a long line. Each of these apparatus will be described in further detail below.

Cages

The present invention provides a stackable cage for holding oysters. The stackable cage comprises side walls comprising apertures for allowing a flow of water therethrough, with at least one side wall being openable whilst the cage is stacked. An upper portion of the stackable cage is adapted to slidably receive an upper cage thereat and a lower portion of the stackable cage is adapted to slidably receive a lower cage thereat.

The present invention also provides a modular cage for holding oysters. The modular cage comprises a plurality of cages, each of which comprises an upper portion adapted to slidably receive an upper cage thereat and a lower portion adapted to slidably receive a lower cage thereat. The modular cage also comprises a cap adapted to be slidably attached to an uppermost cage of the plurality of cages and slidably received by a float on an oyster long line. Each of the plurality of cages in the modular cage may be provided in the form of the stackable cage of the present invention (i.e. as described below), however, this need not be the case in all embodiments of this aspect.

Traditionally, oysters are held in large cages whilst growing. Whilst such cages are fir for purpose (and have been used in the oyster industry in Australia for many years), the inventor has recognised that they have a number of attendant problems, many of which can be overcome by the cages of the present invention. Advantageously, providing oyster-containing cages in a stackable, modular form enables each of the cages to have a significantly smaller volume than many existing oyster cages, but with the collection of stacked cages (e.g. the modular cage) having a combined volume capable of holding the same number (or more) of oysters. By distributing the oysters across a number of smaller cages, however, the oysters can be more evenly spread out and therefore physically able to access more of the nutrients in the water flowing through the cages. As would be appreciated, the growth rate of oysters will increase with their access to nutrients in the water. Furthermore, the risk of the oysters suffering crush damage, such as can sometimes happen at the bottom of large, uncrowded cages is significantly lessened Oyster cages having a smaller size then conventional cages may also be easier to handle and empty, etc.

Additionally, the modular nature of the stackable cages of the present invention enable the total size of a modular cage to be easily varied, simply by adding or removing one or more cages to or from the top (or bottom) of the stack. Thus, the quantity of oysters can be adjusted depending on factors such as the depth of the water (and tidal range), amount of nutrients present, etc. in order to even further enhance their growth.

Any method may be used in order for the adjacent upper and lower cages to be slidably received thereat. For example, in some embodiments, the upper portion of the stackable cage may comprise a channel and the lower portion a complimentary shaped rail (or vice versa). The cages are slidably joinable by aligning the rail and channel and sliding the rail into the channel the appropriate distance. Once so stacked, any suitable locking mechanism (e.g. a split pin, or the like) may be used to retain the stacked cages together.

In some embodiments, the channel and rail extend for substantially the entire length of each stackable cage in order to maximise the strength of the connection between adjacent, stacked cages. In alternative embodiments, however, the channel and railing need not extend for a substantial length of the cage, but may, for example, be provided in the form of short sections spread along the length of the cage. Such sections may have the desired strength, but would require less material for forming. In some embodiments, a rail that extends for substantially the entire length of a stackable cage may be adapted to be slidably received into short sections of channel spaced along the length of an adjacent stacked cage (and vice versa).

The cage has side walls having apertures for allowing a flow of water therethrough, and at least one side wall can be opened whilst the cage is stacked. As would be appreciated, this would enable specific cages in a modular cage to be opened independently of other cages in the stack, and without having to unstack the stacked cages (which would increase the time and the area required to do so). Such ready access may greatly simplify oyster farming operations under some circumstances.

The cage may, for example, include an end that is openable (e.g. by pivoting about an edge) in order to access oysters contained within the cage (or to add oysters to an empty cage). Alternatively, although it may involve more effort and a larger work area to do so, a stacked cage might also be openable by sliding its upper cage off (i.e. in embodiments where the top of the cage is provided by the bottom of another cage). This may provide a larger opening for loading or unloading oysters, if the speed at which this needs to be done is important.

The cage may have any convenient shape, provided that it is capable of having the features described herein and being stackable in the manner disclosed herein. In some embodiments, the stackable cage may be a rectangular prism in shape, although it could also have a cylindrical or triangular pyramidal shape, for example.

In some embodiments, the cage may comprise a base and upright sides, whereby a base of an upper cage defines a lid of the cage. When assembled, such a cage would have a rectangular pyramidal shape, with the base of an upper cage defining the top of the cage (i.e. when the upper cage was slid onto the cage). The amount of material required to form each cage in the stack would therefore be reduced, and the flowability of nutrient-containing water through the stacked cages be even less hindered.

In some embodiments, the stackable cage may be formable from a flat material (e.g. by folding the flat material). For example, a flat-packed piece of material may be provided with fold lines, tabs, slots, etc. which enable it to be folded into the required three dimensional cage shape.

The uppermost cage in a stack of cages will typically comprise features via which the cages depending therefrom can be hung in the water. In some embodiments, for example, the stackable cage may further comprise a cap that is adapted to be slidably received on top of an uppermost stackable cage. Such a cap may comprise a lid for the uppermost stackable cage, and a member adapted to be slidably received by a float on an oyster long line.

The stackable cages may be made from any suitable material. The stackable cages should be corrosion resistant and be strong enough to handle extended immersion in water exposure to ultraviolet radiation, repeated handling (e.g. during oyster grading, as will be described below) as well as the expected wear and tear of constant tidal movements. Typically, the stackable cages are made from a plastics material, preferably a food grade plastics material in order to reduce any risk of contamination of either the oysters or the estuarine environment in which they are grown. Appropriately durable and corrosion-resistant metals may, however, be used in some circumstances.

The side walls (and, typically all faces of the cages) of the stackable cages also typically have a number of apertures in order to allow water to flow through the cages, such that nutrients in the water can be consumed by the oysters contained therein. The size and pattern of the apertures can be adjusted to depend on factors such as the size of the oysters to be contained therein and nutrient content of the water. In general, the larger the apertures the better, although they should (of course) not be so large that younger (and hence smaller) oysters might fall out. Furthermore, allowing such a flow of water reduces the drag of the stacked cages in the water, which can be important when a large number of stacked cages are on the same longline and repeatedly subjected to tidal flows in opposite directions.

Floats

The present invention also provides a float adapted to engage a plurality of oyster long lines and from which one or more oyster cages (e.g. such as those described above) may depend. The float comprises spaced apart channels adapted to receive the plurality of long lines therein, at least one of the channels comprising a recess adapted to retain therein a bulbous portion provided on at least one of the long lines; a lower attachment from which the one or more oyster cages may depend; and an upper attachment for lifting the float from the water.

Advantageously, the floats of the present invention can hold the plurality of long lines apart by a precise and consistent distance, with the floats being positionable relatively close together because they cannot easily twist with respect to the plurality of long lines (e.g. compared with prior art systems where floats are commonly attached to a single long line and can become entwined if positioned too closely together). The floats are not able to escape from the longlines due to the longline being located in and retained by the channel, and the location of the bulbous portion in the recess substantially prevents movement of the (each) float along a length of the longlines.

Furthermore, as there tends to be much less relative movement between the floats of the present invention and the plurality of longlines (e.g. compared with prior art systems), then wear and tear on the floats (and other components of the oyster farm) due to constant water movement may be reduced.

In some embodiments, one or, more typically, both of the channels may be tapered such that the bulbous portion provided on the at least one long line is guided towards the recess as the float is lowered onto the long lines. Such tapering can also help to guide the longlines into their respective channels, even in the event of the float being returned to the water in a haphazard manner, where one or more of the longlines are not precisely located with respect to the centre of the channel(s).

In some embodiments, each channel comprises its own recess. Whilst it is only necessary for one of the channels to comprise a recess in order for the float to be held in position on the longline (i.e. thus being unable to slide along the longline), providing recesses (and complementary bulbous portions on the other longline(s)) in each channel substantially prevents such movement across a number of parts of the float, thereby even more securely holding them in position with respect to the longline. For the reasons discussed below, holding the floats in such a manner can facilitate the use of the floating platform of the present invention, and even further improve the efficiency of the oyster farm. In embodiments comprising three (or more) channels, however, it may well be sufficient if only two of those channels comprise recesses.

The recess may have any shape, but is usually complementary in shape to the bulbous portion so that the bulbous portion snugly fits inside the recess. The bulbous portion may, for example, be provided in the form of a knot in the longline. It is possible to purchase longlines which have knots pre-tied therealong at precise intervals, thereby providing a longline adapted to receive floats of the present invention at predefined distances apart. The distances between knots/floats will depend on factors such as the width of the floats (and any cages depending therefrom) and the strength of the water flow perpendicular to the longlines, and may (in some embodiments) vary from 1-2 meters.

The float typically has two channels, each channel comprising a recess adapted to retain the bulbous portion of the respective long lines. Typically, the float is elongate in shape and the channels are at distal ends thereof in order to provide the greatest possible stability.

The float is typically weighed down by one or more oyster cages and hence the longline is unlikely to be capable of escaping the channel. However the possible inconvenience or damage that could be caused should a float somehow become disengaged from the longlines may make it worthwhile to include a retaining mechanism for retaining a longline in its respective channel. In some embodiments, it may therefore be desirable to more securely retain one or more of the longlines in its respective channel.

Any manner via which this may be achieved may be used, given the structure of the float described herein. In some embodiments, for example, an entry to the channel may be closable by a latch that is operable (e.g. moveable) by a user. The latch may, for example, be pivotable (or otherwise moveable, e.g. by sliding or twisting) between channel open (i.e. channel unblocked) and channel closed (i.e. channel blocked) configurations. The latch may, for example, comprise a handle that is graspable by a user (e.g. a user wearing gloves). The latch may also include features that can help to guide the longline into the channel (and the bulbous portion into its recess) during its operation, as well as a visual indication that the bulbous portion and recess are correctly positioned (e.g. the latch will only fully close when this occurs). A specific form of a latch having these features will be described in further detail below.

One or more oyster cages may depend from the lower attachment of the float. Any suitable mechanism may be used to secure the oyster cages to the lower attachment of the float. In some embodiments, for example, the lower attachment may be a channel adapted to slidably receive therein a complimentary shaped rod provided on a member from which the one or more oyster cages may depend. In embodiments where the oyster cages are the stackable oyster cages of the present invention, the complimentary shaped rod may be the member adapted to be slidably attached to a float on an oyster long line described hereinabove. If necessary, a suitable locking mechanism may be provided in order to securely retain the oyster cages with the lower attachment.

The float may, in some embodiments, comprise a plurality of lower attachments, each of which is adapted for oyster cages to depend from. In some embodiments, the float comprises two lower attachments. In some embodiments, the lower attachments are located at distal ends of the float (positioned at a location where lifting of the float and oyster cages dependent therefrom off the longline and out of the water will not result in snagging of the oyster cages on the longlines).

The float also has an upper attachment for lifting the float out of the water and off the longlines. The upper attachment may be located on any upper portion of the float, provided that it is readily accessible. Typically, the upper attachment is centrally located on the float in order for the float to be substantially evenly balanced when lifted (as described below). The upper attachment may have any suitable form and may, for example, be a loop adapted to receive a hook therein. In some embodiments, it may be advantageous for the float to have two upper attachments (e.g. evenly spaced on an uppermost surface of the float), thereby more evenly distributing its weight.

The float may have any suitable shape and is typically substantially rectangular pyramidal in shape. In some embodiments, the float may comprise rounded edges in order to reduce the risk of the float becoming jammed between the hulls of a working platform as is described below.

The float is adapted for carrying oyster cages underneath it. In some embodiments, the oyster cages that depend from the lower attachment(s) are the stackable cages for holding oysters of the present invention.

The float may be formed of any, suitable material. Typically, the float is formed from a buoyant plastic material, which has a high degree of UV resistance. In embodiments where any of the components of the float are metallic (e.g. the upper loop), then these are made from corrosion resistant metals, such as marine grade stainless steel, and are usually integrally formed with the float (e.g. during the moulding process).

Floating Platform

The present invention also provides a floating platform for deploying and retrieving oyster cages on a long line. The floating platform comprises a first portion; a second portion that is detachably connected to (i.e. detachable from) the first portion, and a lifter for lifting and lowering oyster cages (e.g. the stackable oyster cages of the present invention described above). A buoyancy of the first portion and a buoyancy of the second portion are independently adjustable in response to a weight distribution over the floating platform.

As will become apparent from the discussion below, the floating platforms of the present invention can provide a number of advantages over the vessels traditionally used for oyster farming. Indeed, such vessels are often simple aluminium flat bottomed boats, from which a user has to lean out of to work (which is bad for the operator's health and also carries a risk of an operator falling out of the vessel). The floating platforms of the present invention can make it much easier to work oysters more regularly and, by doing this, reduce their growth time by many months.

Further, even if the existing vessels include some sort of a lifting device such as a crane, then the weight that can be lifted may be limited due to the crane having to extend over a side of the vessel and the subsequent acentric lifting action causing a capsizing risk. Furthermore, even when loaded onto a vessel, it is necessary to store the oyster cages in specific locations on the vessel in order to maintain its level. For this reason, some vessels do not store the collected oyster cages for any length of time, but immediately transfer them to a second boat which takes them to shore for further processing. As would be appreciated, whilst the existing vessels can be made to work in oyster farming applications, they are not really compatible with efficient processes, all generally requiring multiple vessels and/or multiple trips between the oyster farm and the land based processing facility.

In contrast, the adjustable buoyancy of the present invention operates in response to such changes of weight distribution over the floating platform to keep the floating platform level, despite potentially having very large off-centre mass. In some embodiments, the buoyancies of the first and second portions may be independently adjustable to maintain an upper surface of the floating platform in a substantially level configuration. That is, no matter how many more oyster cages are stored on one of the portions than the other (within reason, of course), their buoyancies are independently adjustable in order to level out the platform. The significant advantages which this can provide an oyster farmer will be described in further detail below.

Any suitable technique may be used to adjust the buoyancy of the first and second portions. In some embodiments, for example, the first portion may comprise a first reservoir and the second portion comprise a second reservoir, the first and second reservoirs adapted to receive and discharge a fluid (e.g. air or water) in response to the weight distribution over the floating platform. In some embodiments (discussed below), when the floating platform includes a third portion, then the buoyancy system can also extend to this portion.

In some embodiments, for example, the floating platform may further comprise one or more pumps in communication with the first and second reservoirs, the one or more pumps being operable to pump water into and out of the first and second reservoirs (i.e. in response to the weight distribution on the floating platform). In some embodiments, the first reservoir may have a first pump and the second reservoir have a second pump. The water may be water stored on the floating platform, or simply water pumped, in from an inlet underneath the platform (bearing in mind that this will be brackish water and the pump must therefore be adapted to operate in salt water).

Any suitable system may be used to monitor the angle of the upper surface (i.e. the deck) of the floating vessel (and its various portions) and operate the pump or pumps (or the like) such that the upper surface remains substantially level (or has some other desirable configuration). It is envisaged that a number of sensors would be positioned about the various portions of the floating vessel, with data obtained from these sensors being fed into a CPU operating a program that is capable of sending instructions to independently adjust the buoyancy of the portions (e.g. by actuating the one or more pumps).

The lifter may be any apparatus that is capable of lifting oyster cages, such as the modular oyster cages of the present invention described herein, which may weigh a few hundred kilograms, especially when they are first withdrawn from the water. In some embodiments, the lifter may, for example, comprise a gantry and a hoist for lifting and lowering the oyster cages from the long line.

The floating platform may further comprise an elevated railing from which the oyster cages can hang and along which the oyster cages are slidable (e.g. from the hoist into a storage location). As would be appreciated, sliding oyster cages just retrieved from the water along an overhead rail would be a significantly easier task than lifting and/or dragging them along the deck of the floating platform.

The storage location may comprise a first storage location on the first portion and a second storage location on the second portion, thus providing separate storage locations on the detachable portions of the floating platform. Such storage locations may be used to store oysters which need to be returned to the water (e.g. post-grading) separately from oysters just recovered from the water (i.e. pre-grading). The advantages of this will be described in further detail below in the context of a specific embodiment.

In some embodiments, the elevated railing (e.g. the elevated railing of the storage location) may be adapted to couple with (e.g. by being joined to) a land-based elevated railing, along which land-based elevated railing the oyster cages are slidable. Once so coupled, a continuous overhead railing is effectively formed and the oysters can be slid directly into or out of the storage location (i.e. on the work platform) and into or out of the land-based facility (e.g. an oyster grading facility or an oyster processing facility).

In order for the elevated railing of the floating platform (or one of its portions) to couple with the land-based elevated railing, the floating platform (or portions thereof) must be maneuvered into a loading position. The loading position may be on land (e.g. in embodiments where the first and/or second portion is adapted to be moved over land) or, less likely, may extend from the land to over the water, where it can be coupled to the elevated railing on the working platform (noting that tidal movement might make aligning the land-based overhead railings with those on the floating platform difficult).

In some embodiments, the floating vessel, or its detached first or second portion, may be manoeuvrable into the loading position in which the elevated railing is coupled with the land-based elevated railing such that oyster cages are loadable onto or off from the first and/or second portion. In some embodiments, for example, one or both of the first and second portions comprise wheels and are towable over land (e.g. up a ramp). Depending on the topography at the land-based facility, performing such manoeuvring and loading/unloading may be easier with the detached first and second portions independently, or it may be possible to dock the floating platform in its entirety for loading/unloading.

The floating platform may have any form that enables it to operate in the manner described herein. In some embodiments, for example, the first and second portions (and the floating platform in general) may comprise two water contacting hulls having a space therebetween, the space being adapted to accommodate therein oyster cages on the long line. The advantages of such a configuration will be described in further detail below.

Typically, the floating platform further comprises a third portion that is detachably connected to the first and second portions. The third portion may be the portion from which the floating platform is controlled by a user, and would thus contain the drive controls, release controls, lifter controls, etc.

In some embodiments, the third portion may also comprise an aperture through which the oyster cages are liftable from and lowerable onto the longline (i.e. liftable out of and lowerable into the water). In such embodiments, the lifter does not need to lift a relatively heavy mass from the side of the vessel, but can instead lift it from a relatively central position, and not potentially unbalancing the vessel to as great a degree, as is the case for some currently-used vessels. Furthermore, it is not necessary for the operator to lean over the side of the platform in order to retrieve the oyster cages from the water.

The floating platform may be propelled through the water using any suitable propulsion mechanism or system. In some embodiments, the floating platform may further comprise a plurality of outlets, from which water may be discharged in order to propel the floating platform through the water. Such outlets are commonly referred to in the industry as jet thrusters and, when orientated facing sideways, side thrusters. Providing such thrusters facing in all directions from the working platform enables the working platform to be moved in any direction, which can be especially useful when manoeuvring the platform with respect to long lines (and especially when there are factors such as tidal flows to contend with as well). Whilst propellers can also be used to propel the working platform, these should generally be avoided (particularly when manoeuvring around the oyster lease) because of the risk of the propeller blade either damaging or becoming snagged in the infrastructure on an oyster lease (e.g. an oyster cage or longline).

Specific embodiments of the present invention will now be described with reference to the accompanying drawings.

Figure 2:
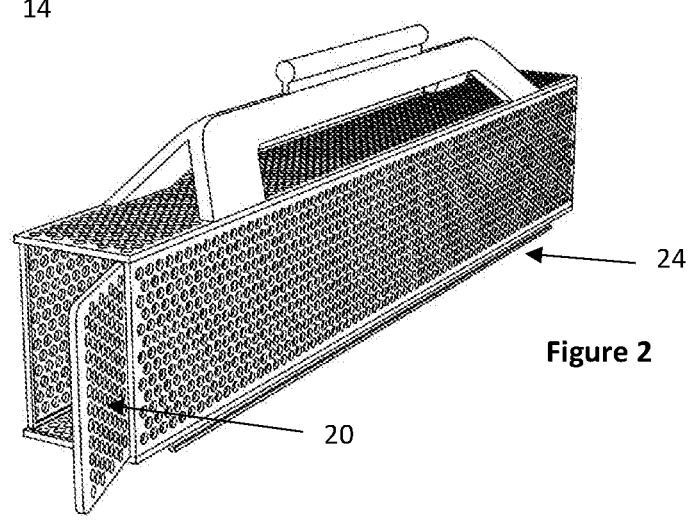
FIG. 2 shows the oyster cage and cap of FIG. 1, in an open configuration.
Figure 3:
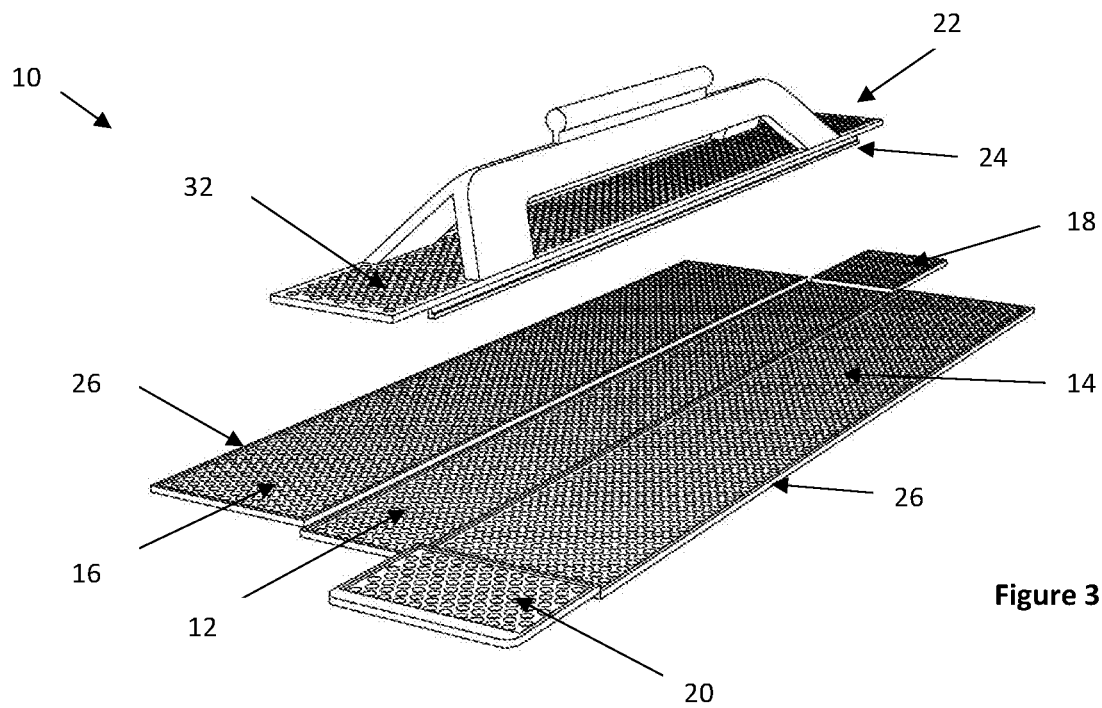
FIG. 3 shows the oyster cage and cap of FIG. 1 in a disassembled state.
Figure 4:
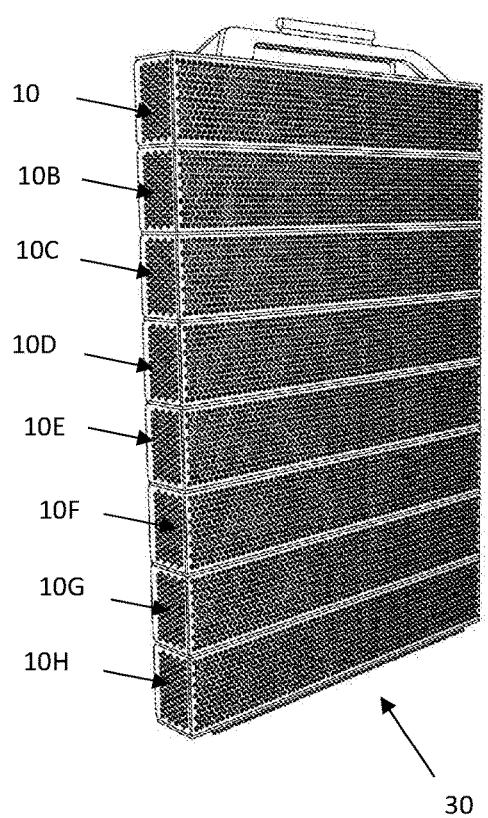
FIG. 4 shows a stack of oyster cages including the uppermost oyster cage of FIG. 1, from which depend seven stacked oyster cages in accordance with an embodiment of the present invention.
Figure 5:
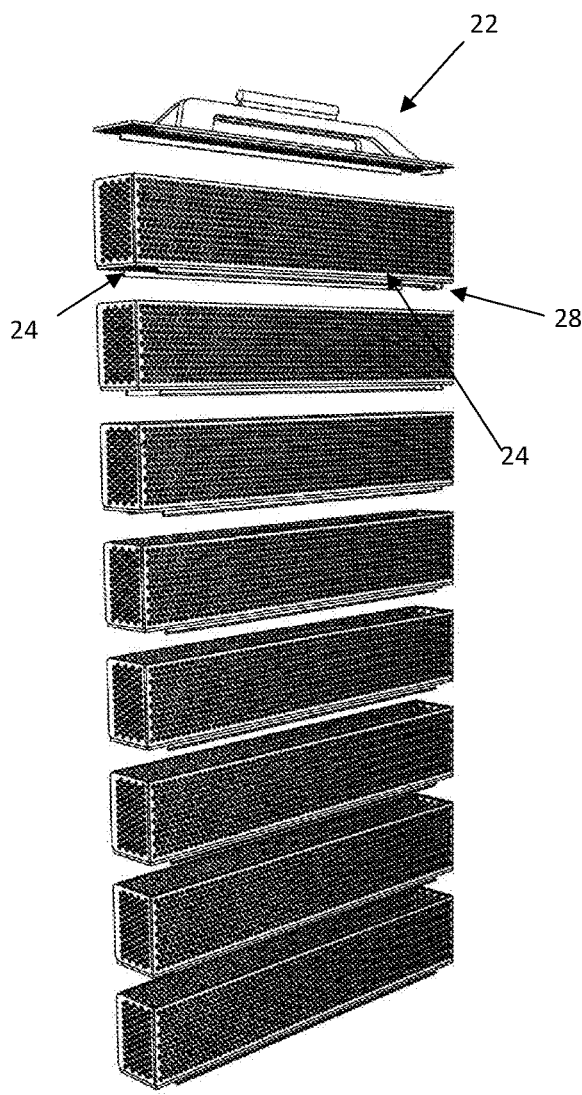
FIG. 5 shows an exploded view of the stack of oyster cages of FIG. 4.

An uppermost stackable cage and cap in accordance with an embodiment of the present invention is shown in FIGS. 1 to 3, with the resultant modular cage being shown in FIGS. 4 and 5. Referring firstly to FIGS. 1 and 3, shown is a stackable cage for holding oysters in the form of cage 10. Cage 10 has a rectangularly shaped base 12, as well as rectangularly shaped lateral sides 14, 16 and ends 18, 20. Cag 10 also has a cap 22, which will be described in further detail below.

As can be seen, cage 10 is assemblable from a flat pack (FIG. 3), making it easy to transport and store when not in use. It is envisaged that such cages will be formed from sufficiently durable food grade plastics, although they could also be formed from other plastics or corrosion-resistant metals. The cage 10 is simply formed by folding the sides 14, 16 and ends 18, 20 as can be seen by comparing FIGS. 2 and 3, for example, and affixing them together using suitable means (not shown for clarity). End 20 is pivotably attached to side 14, which enables it to act as a door to the inside of the cage 10 (compare FIGS. 1 and 2), through which oysters can be emptied from or added to the cage 10, even when stacked as shown in FIGS. 4 and 5.

Referring to FIG. 1, the lowermost (in use) edges of both longitudinal sides of base 12 have a L-shaped railing 24, 24 (both railings can be seen in FIG. 5). L-shaped railings 24, 24 are adapted to be slidably received into channels 26, 26, provided on uppermost (in use) inside edges of sides 14 and 16 (see FIG. 3). One lateral edge of base 12 also has a tab 28 (see FIG. 5), which engages an upper portion of end 18 and acts as a stop when an upper cage is slid on top of cage 10 and is positioned directly thereover (as can be seen in FIGS. 4 and 5). Although not shown, a locking mechanism (e.g. a snap-fit type mechanism) may be provided to securely lock the adjacent cages 10, 10 together.

In this manner, and as can be seen in FIGS. 4 and 5, a plurality of cages (cages 10, 10B, 10C, 10D, 10E, 10F, 10G and 10H) can be stacked on top of each other to thereby form a modular cage 30 having a relatively large volume, but without the problems attendant with non-modular cages having a similar volume (as described above). Furthermore, cages 10 may be added or taken away from the modular cage 30, depending on the depth of water in the particular oyster farm in order to maximise the production of oysters at that location.

Cap 22 sits on top of and covers an uppermost cage 10 in a stack of cages, as can be seen for example in FIGS. 4 and 5. Cap 22 has a lid 32, which is shaped to fit over the top of uppermost cage 10 and be slidably attached thereto via railings 24, 24 being slidably received in the channels 26, 26 of the uppermost cage 10, as described above. Cap 22 also has a handle 34, the arms of which extend to opposite sides of the cage 10 (directly above the channels 26 and railings 24) and at distal ends thereof in order to more evenly distribute the weight of cages 10, 10B, etc. The uppermost (in use) portion of handle 34 has a circular rod 36 centrally located thereat, which is shaped to be slidably received in a float on an oyster long line, as will be described below.

Once attached to a float on an oyster long line, the modular cage 30 is suspended in the water column, such that the oysters contained within cages 10, 10B, etc. have maximum exposure to nutrients in the water column. Typically, the long face of the modular cage 30 (e.g. sides 14 and 16) will be positioned perpendicular to the tidal flow of water in order to achieve this.

Each cage 10 is adapted to receive an amount of oysters appropriate to the size of the cage, but not so many that overcrowding and hence potentially hindering the growth of the oysters by restricting their access to nutrients in the water occurs. For example, in a specific embodiment of the invention, where Angasi oysters are being grown, the cage may be 150 mm wide, 100 mm high and 800 mm long. As will be appreciated, when used in the oyster farming methods disclosed herein, the cage size will also need to conform to the operational parameters (primarily dimensions and weight) of the relevant working platform.

Figure 6:
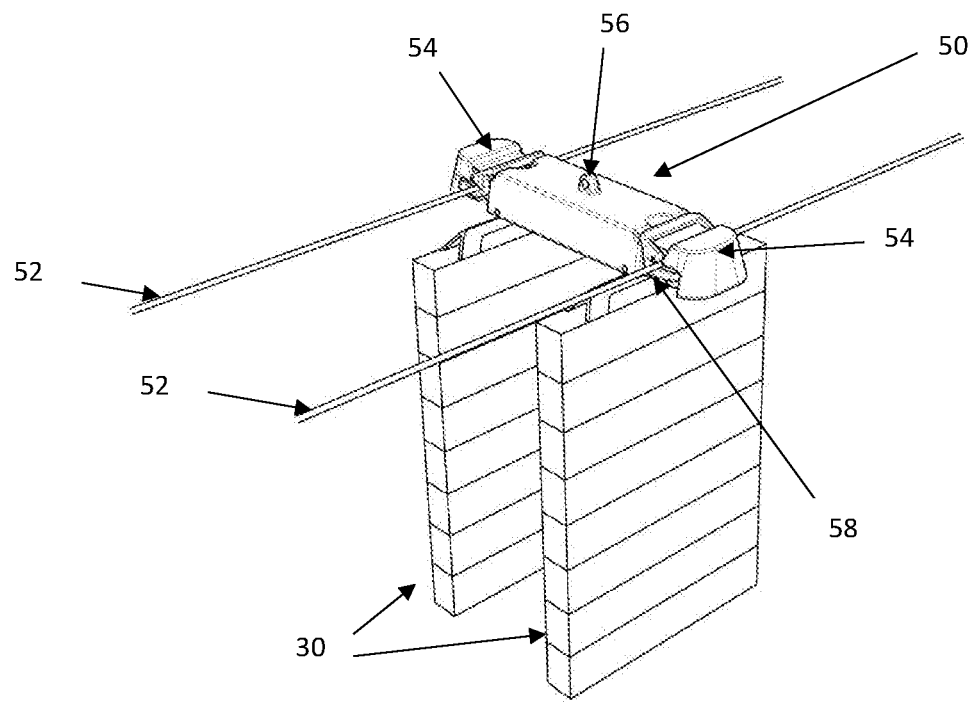
FIG. 6 shows a float in accordance with an embodiment of the present invention engaged to and spanning two oyster long lines and with stacks of oyster cages depending therefrom.
Figure 7:
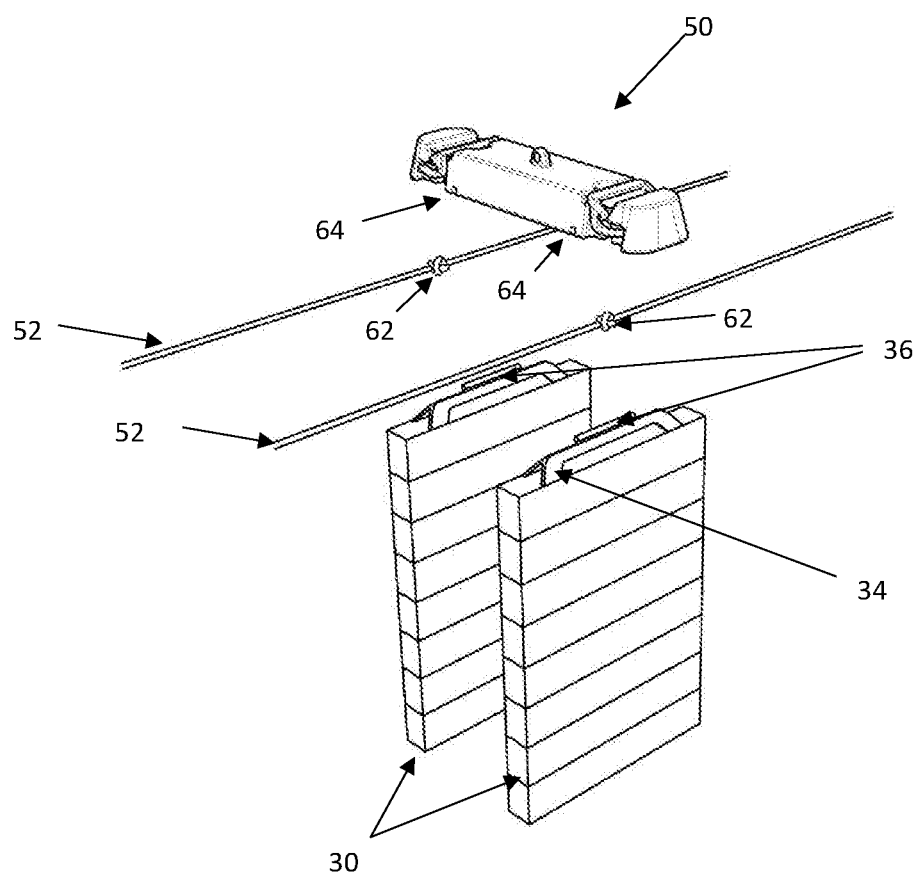
FIG. 7 shows an exploded view of the float, long lines and cages of FIG. 6.
Figure 8:
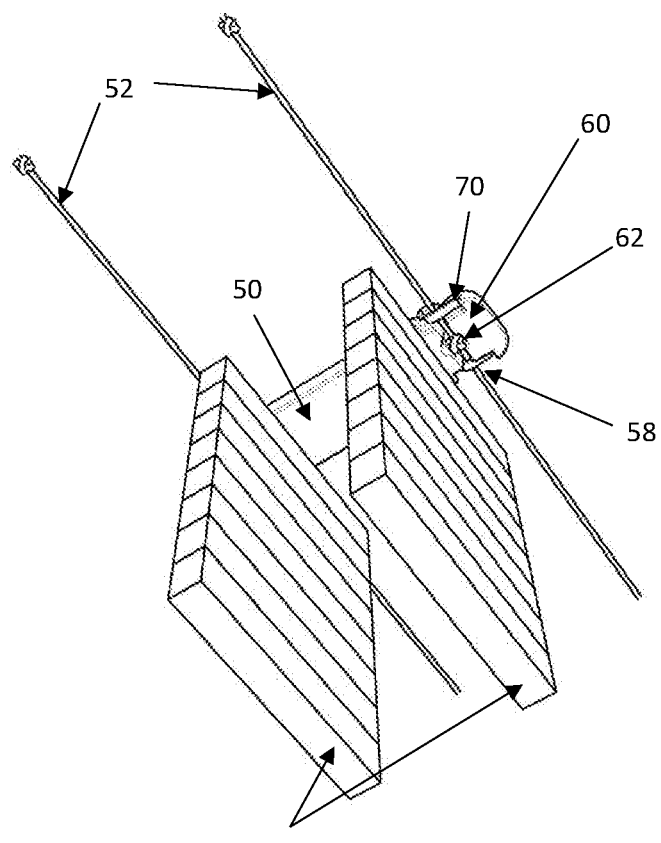
FIG. 8 shows an underneath view of the float, long lines and cages of FIG. 6.

A float in accordance with an embodiment of the present invention is shown in FIGS. 6 to 9. Referring firstly to FIGS. 6 to 8, a float 50 is shown spanning two long lines 52, 52. The long lines 52, 52 are anchored to the seabed in the manner described below and are held in a parallel configuration due to a number of floats 50 being spaced therealong, in the manner shown in FIG. 14 and described below.

Float 50 is generally a rectangular prism in shape, and has rounded distal ends 54, 54 which help to guide the working platform along the long lines 52, 52 in the manner described below. Float 50 also has a upper attachment in the form of eyelet 56 centrally located thereon. Again, the purpose of eyelet 56 will be described in further detail below.

Adjacent distal ends 54, 54 of float 50 include lateral channels 58, 58. As channels 58 are identical in the embodiment shown, only one channel will be described herein in detail. Channel 58 is provided in the form of a V-shaped notch on an underside of float 50, and which extends inwardly for about half pf the height of the float 50. The V-shape of channel 58 acts as a guide for the long line 52, such that a user does not have to precisely for the float 50 back onto the long line 52 (as will be described in more detail below). In effect, the channel 58 is widest at its entrance, but then tapers down to a width not that much greater than the diameter of the long line 52. Once securely received in the channel 58, the long lime 52 and float 50 therefore do not have a high degree of relative movement.

Channel 58 also includes a centrally located recess 60 (see FIG. 8). This recess 60 is shaped to receive therein a bulbous portion on the long line 52, provided in the form of a knot 62. The recess 60 may have any shape, provided that it can securely receive and retain the knot 62 therein. Typically, the recess 60 is tapered in shape such that, as described above in respect of the channel 58, the knot 62 is guided into the recess 60 as the float 50 is lowered back onto the long line 52.

As would be appreciated, once knot 62 is received within recess 60 (and long line 52 within channel 58), the float 50 has only a very limited possibility for lateral and longitudinal movement with respect to the long line 52. A plurality of knots 62 can be provided (not shown) at spaced apart lengths on one or both of the longlines 52, 52 in order for each float 50 to be held in specific and predefined location on the longlines. In this manner, the floats (e.g. 50) can be held in a very precise configuration on the longlines (e.g. 52, 52) as can be seen in FIG. 14 and which, as will be described below, helps to maintain the oyster cages in an optimal orientation and makes the retrieval and replacement of the oyster cages run more efficiently.

The float 50 also, has secondary channels 64, 64 located inside of and proximal to channels 58, 58 (although not so close that the top of modular cages 30, 30 might become snagged on long lines 52, 52 during lifting in the manner described below). Each secondary channel 64 is shaped to slidably receive therein the rod 36 of the cap 22 at the top of the modular cage 30. The circular nature of rod 36 and channel 64 allow some degree of rotational movement between the float 50 and modular cage 30, which can help to mitigate effects of the tidal surges that will be felt by the modular cage 30, and prevent them being fully transferred to the float 50 and hence long lines 52, 52, etc.

The modular cage 30 may be removed from the float 50 (i.e. on the working platform) simply by sliding the rod 36 out of the channel 64. However, as the modular cages 30 are deployed perpendicular to the tidal flows, such a movement is highly unlikely to occur whist underwater. Nevertheless, as can be seen, the length of the rod 36 is significantly longer than the length of channel 64 (and width of the float 50) in order to make such an event even more unlikely. Alternatively, a locking pin (or the like, not shown) can be used to prevent the rod 36 from inadvertently sliding out of the channel 34.

Figure 9:
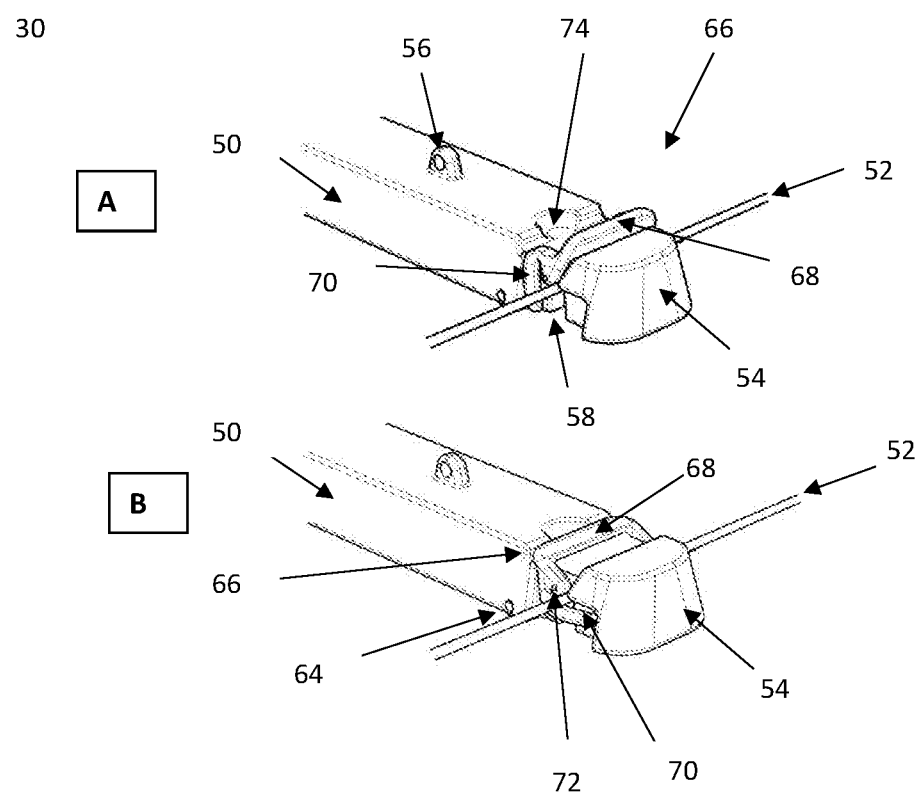
FIG. 9 shows the float of FIG. 6 and, in particular, a latch in accordance with an embodiment of the present invention in channel open and channel closed configurations.

FIG. 9 shows one of the rounded end portions 54 of float 50 in greater detail. As can be seen, a manually operable latch 66 is provided to block the channel 58 opening. The latch 66 has a handle portion 68 and a blocking portion 70, and is pivotally connected to the float 50 via a pin 72. In use, the handle portion 68 is normally in a closed configuration (see FIG. 9B), where the handle portion 68 lies flush against the upper surface of the float 50 (where it is highly unlikely to accidentally be lifted) and the blocking portion 70 blocks the opening of the channel 58, and hence prevents the long line 52 from being able to escape from the channel 58 (and knot 62 from recess 60). Indeed, blocking portion 70 in effect physically pushes the long line 52 right to the uppermost end of the channel 58 (and knot 62 right into recess 60), further limiting any potential relative movement of the float 50 with respect to the long line 52.

When a user wants to lift the float 50 (and cages 30, 30, etc.) off the long lines 52, 52, then they first grasp the handle portion 68 and pivot the latch 66 into an open configuration that shown in FIG. 9A) by pulling the handle portion 68 towards the distal end 54 of the float 50. The handle portion 68 may be provided in an easily graspable form, even for a user wearing gloves, for example by being relatively large in size. The distal end 54 of the float 50 may also be provided with a finger recess 74. As can be seen in FIG. 9A, once so lifted, the blocking portion 70 is correspondingly moved such that it now no longer blocks entry into or out from the channel 58. A similar operation may subsequently (or simultaneously) be carried out for a handle (not shown in detail) on the opposite side of the float 50, such that the float 50 may now be lifted off the long lines 52, 52.

This operation is reversed after the float 50 has been lowered back onto the long lines 52, 52 in order to securely attach the float 50 onto the long lines 52, 52. Closing the latch 66 can also provide confirmation of the float 50 being appropriately positioned on the long line 52 (assuming that the knot 62 cannot be seen adjacent the float 50, in which case the float 50 is been badly placed onto the long line 52); if the latch 66 will not close properly, then it is likely that the blocking portion 70 is pressing against the knot 62, which is indicative of knot 62 not being appropriately positioned in the recess 60.

Figure 10:
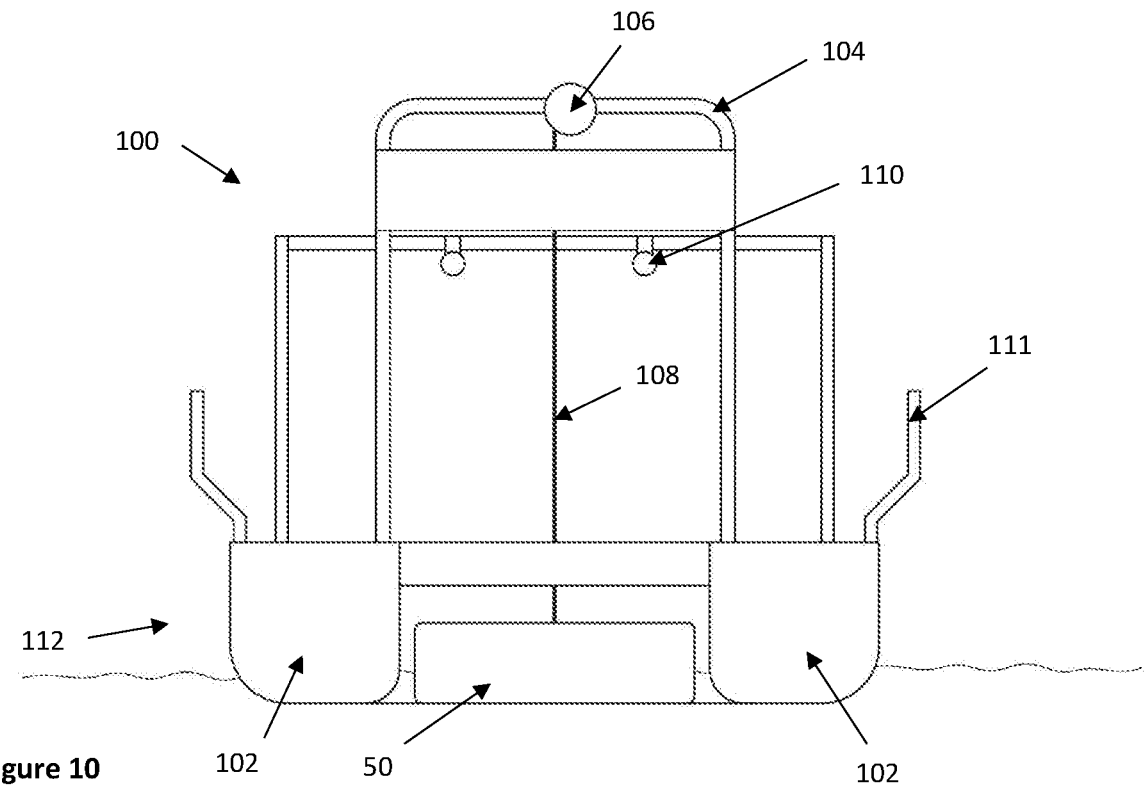
FIG. 10 shows a front view of a floating platform in accordance with an embodiment of the present invention in which a float is ready to be lifted out of the water.

A floating platform for deploying and retrieving oyster cages from a long line in accordance with an embodiment of the present invention is shown in FIGS. 10 to 13. Referring firstly to FIG. 10, a floating platform in the form of barge 100 is shown. Barge 100 has two hulls 102, 102, which are spaced apart such that floats 50 can be received therebetween (see FIGS. 10 and 12). Barge 100 also has a lifter in the form of gantry 104 and host 106, which uses a cable 108 to lift and lower items to which it is affixed (e.g. via a hook or the like, not shown). Barge 100 also has overhead railings 110 which, as can best be seen in FIG. 12, link the gantry 104 with other portions of the barge 100. Overhead railings 110 may have any suitable form and include, for the reasons discussed below, a channel therethrough which is similarly shaped to secondary channels 64 and is adapted to slidably receive therein the rod 36 on the cap 22 of the modular cages 30. The barge 100 also has safety railings 111, 111, which help to prevent an operator from falling overboard.

Referring now to FIGS. 12 and 13, it can be seen that barge 100 has three portions; a front portion 112 and rear portions 114 and 116. Portions 112, 114 and 116 are all detachable from each other, for the reasons described below. When on the water, however, portions 112, 114 and 116 are usually joined together using any suitable mechanism (not shown for clarity). The overhead railings 110 start on front portion 112 and extend onto both rear portions 114 and 116, with items depending from the overhead railings 110 being moveable to/from front portion 112 to/from rear portion 114 or rear portion 116, depending on the route chosen. Items (e.g. modular oyster cages 30, as described below) can be slid along the overhead railings 110 in the manner described below.

The rear portion 114 has a storage area 118 reserved in use for the storage of oyster cages (e.g. modular oyster cages 30, as discussed below). Similarly, rear portion 116 has a storage area 120. These areas 118, 120 begin at a distal end of the portion 114, 116 (i.e. the end distal to the front portion 112), and extend towards the front portion 112. For example, in FIG. 12, there are two cages 30 in storage portion 118 and two cages 30 in storage portion 120 whereas, in FIG. 13, there are two cages 30 in storage portion 118 and six cages 30 in storage portion 120.

As would be appreciated, if the number of modular oyster cages 30 on one of the rear portions 114, 116 were different to that on the other of the rear portions 116, 114, then the barge 100 might become unbalanced in the water and its deck would on an angle (presenting a capsizing risk and potentially hazardous working environment). In order to address this, however, the barge 100 also includes a pump or pumps (not shown) operable to pump water into reservoirs (not shown) in the front 112 and rear 114, 116 portions. The pump is operated such that water is taken in from the surrounding environment and used for ballast in order to provide an even weight distribution over the barge 100. In this manner, the surface of the barge 100 can be maintained in a substantially level configuration, even in the event of one of the storage Portions 118, 120 being full of oysters (and hence very heavy), whist the other of the storage portions 120, 118 is empty.

The rear portions 114, 116 also include an attachment point, such as a hook (not shown), on their distal portions, as well as wheels (or the like, not shown) that enable them to be towed onto land. In this manner, once detached, rear portion 114 or 116 may be winched (for example) into a transfer position in which its overhead railing 110 is brought into contact with a similar overhead railing (not shown) of a land-based processing facility (e.g. for grading of the recovered oysters). Once in this position, any oyster cages (etc.) in the storage position 118 or 120 can be transferred via sliding into the land-based facility. Similarly, processed oysters which are ready to be returned to the water can be transferred to an empty rear portion 114 or 116 when this is in the transfer position. Once all of the necessary transfers have taken place, the rear portion 114 or 116 can be lowered (for example) back into a position where it can be rejoined to the other rear portion 116 or 114 and the front portion 112.

The efficiency of this oyster recovery and transfer process can be even further enhanced by providing another portion (not shown) similar to portions 114 and 116. This portion can be pre-loaded with graded oysters and be left moored in the water awaiting the return of the barge 100 laden with oysters for grading. Once the portion 114 or 116 containing the ungraded oysters is detached from the barge 100, the other portion can immediately be attached to the barge 100, which can then head back out to the longlines. The portion 114 or 116 containing the oysters for grading can then be processed in the manner discussed above. This would significantly reduce the potential downtime of the barge 100.

The gantry 104 and hoist 106 are located on the front portion 112, as are the controls for driving the barge 100 (not shown for clarity). The front portion 112 also includes an aperture therein in the form of an access portal 122. Access portal 122 is located directly underneath the hoist 106, and is slightly wider than float 50 and slightly longer than modular cages 30, such that a float 50, from which two modular cages 30 depend (in the manner described above), can pass therethrough (compare FIGS. 10 and 11).

The barge 100 may be moved in the water by using water jets (not shown) of the type routinely used in the art. (propeller-driven barges may also be used, but are not preferred due to the possible damage which could be caused by, a propeller and the significant propeller snag hazards). These jets can be positioned at various locations (either facing in different directions, or operable to face in different directions) over the barge 100 and operated by the user.

In use, an operator would orientate the barge 100 in line with the long lines 52, 52 and then drive over them, with the floats 50 being received between hulls 102, 102, as can be seen in FIG. 12. The floats 50, 50, etc. are spaced along the long lines 52, 52 such that, a number of floats (e.g. 5-10, depending on their separation) are located underneath the barge at any given time, and thus they act to guide the barge 100 along the long lines 52, 52, regardless of any cross current the barge 100 may be experiencing. The rounded ends 54, 54 of each float 50 can help to prevent the floats 50 from becoming jammed between the hulls 102, 102.

Figure 11:
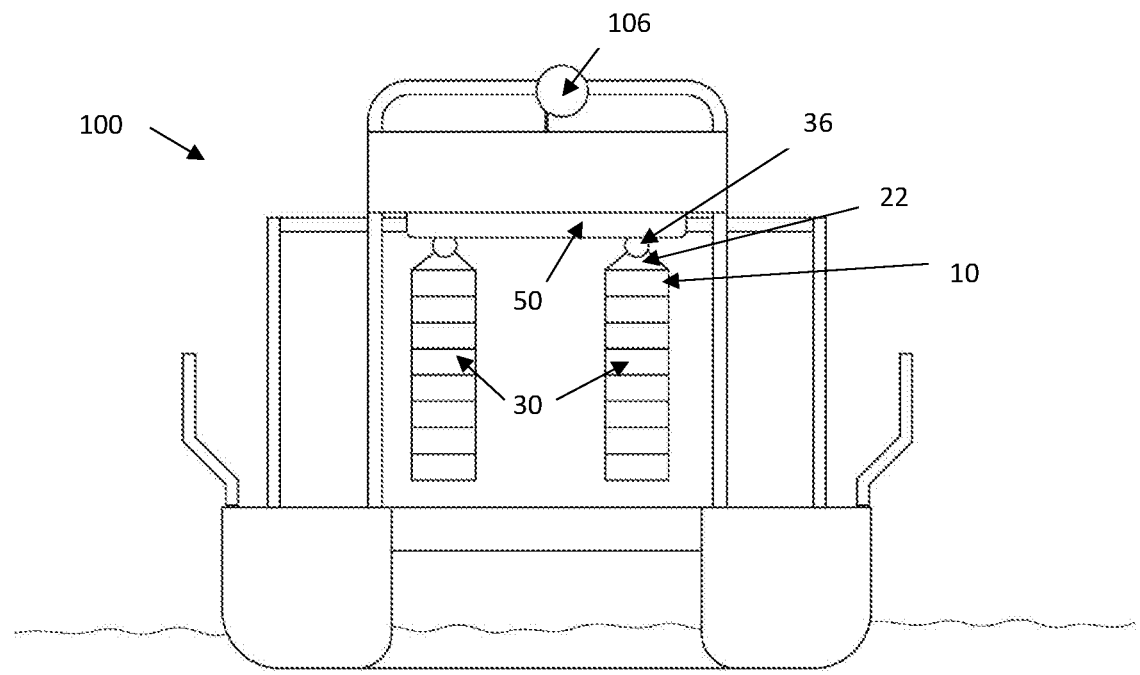
FIG. 11 shows a front view of the floating platform of FIG. 10 in which the float has been lifted out of the water.

When a float 50 is about centrally located underneath the access portal 122, a user would stop the barge 100 and attach the hook at the end of cable 108 to the eyelet 56 on the float 50 (as schematically shown in FIG. 10). Once the latches 66, 66 had been opened, the hoist 106 would be engaged such that the float 50, and its dependent modular cages 30, 30, were lifted off the long lines 52, 52 out of the water, through the access portal 122 and up into a lifted position (as shown in FIG. 11). In this lifted position, the rod 36, 36 of each modular cage 30, 30 is in alignment with the overhead railings 110 and, in particular, with the complementary shaped channel in the overhead railings 110. An operator may then relatively easily (i.e. compared with manhandling the modular cages 30, 30 by lifting or sliding along the deck of the barge) slide each modular cage 30 out from the float 50 and into the channel in the overhead railings 110. Once in the overhead railings, the modular cage 30 may be moved onto either storage position 118 or 120 (e.g. to take into an oyster grading facility for grading, as will be described further below). Similarly, once the float 50 has had the modular cages 30, 30 removed, these can be replaced with other modular cages, for example, containing graded oysters ready to be returned to the water and which were stored on the other of the storage portion 120 or 118.

In a typical operation, oysters ready to be returned to the water (e.g. after grading) will be packed (in an appropriate amount) into the cages 10 of modular cages 30. If necessary, cages 10 may be removed or added to modular cage 30 at this time (e.g. depending on the depth of water where the oysters are about to be deployed). The graded oysters in modular cages 30 are slid along an overhead railing system until they arrive at a transfer position, where the land-based overhead railing ends and is coupled to the overhead railing 110 of the rear portion 114 (for example), which has been pre-positioned for receiving the graded oysters. The modular cages 30 are then all slid onto the storage portion 118 of the rear portion 114, and the rear portion 114 moved (or allowed to move, e.g. by rolling down a ramp) back into, the water for rejoining with the other rear portion 116 and the front portion 112. As rear portion 114 now contains a full load of oysters and the other rear portion 116 nothing, the barge 100 will temporarily be out of balance, until its pump pumps water into the other rear portion 116 and front portion 112 in order to make the surface of the barge 100 substantially level.

The barge 100 can then be moved to the start of a longline 52, 52 containing oysters that need to be removed from the water (e.g. in order to grade them or because they are ready for sale) and the first float 50 on the long line positioned underneath the access portal 122. The float 50 is hoisted up until the modular cages 30, 30 containing oysters to be graded can be slid via the overhead railings 110 into the storage position 120 of the rear portion 116. As these modular cages 30, 30 are the first modular cages to be received on the storage position 120, they would be pushed all the way to the rear of the barge 100.

The modular cages 30, 30 containing graded oysters are then slid from the storage portion 118 of the rear portion 114 into the (now empty) chambers 64, 64 of the float 50 via the overhead railings 110. The hoist 106 is then operated to lower the float 50 and its new modular cages 30, 30 back into the water and onto the long lines 52, 52. The latches 66, 66 are then operated to lock the long lines 52, 52 in the channels 58, 58 and the barge 100 moved onto the next float 50 on the long line. This replacement operation is repeated until either all of the floats 50 on the longline 52, 52 have been replaced, or until all of the oysters initially contained on the storage portion 118 of the rear portion 114 have been returned to the water.

In this manner and in a single operation, oysters requiring grading are removed from the water whilst oysters that have been graded are returned to the water. During all of this operation, the pump(s) pumps water into or out from the respective portions 112, 114 and 116 in order to keep the barge 100 substantially level.

Finally, the barge 100, which now has no remaining (graded) oysters on the storage portion 118 of the rear portion 114 and a full complement of (ungraded) oysters on the storage portion 120 of the rear portion 116 can return to the land-based facility, where the rear portion 116 can be towed out of the water and into the transfer position. Once in this position, the oysters can be slid along the overhead railing system until they arrive at the grading facility.

As described herein, the present invention provides improved oyster cages, floats adapted to engage a plurality of long lines and from which one or more oyster cages may depend, as well as floating platforms for deploying and retrieving oyster cages (e.g. for grading). Embodiments of the present invention may have one or more of the advantages listed below over prior art oyster farming apparatus and systems.

The oyster cages of the present invention are advantageous because:
the cages are modular in nature and thus typically smaller than many existing cages, but the stacked cages are capable of holding the same number (or more) of oysters in a more evenly distributed manner such that they all have ready access to nutrients in the water to thus enhance their growth (i.e. compared to existing cages where oysters can become bunched up at the bottom of relatively larger cages and thus not as readily able (if at all) to access nutrients).
the effective size of the cage can be changed simply by adding or removing one or more cages to/from the stack. Thus, the amount of oysters contained in a cage can be varied depending on factors such as the depth of the water, amount of nutrients present, etc.
the cages are easy to move around (i.e. by sliding along the overhead railings) and do not need to be manhandled.
the cages are easy to open (even when stacked) in order to empty their contents into the grading machine etc.
the cages all have a consistent size and can be provided in a flat-packed form for ease of handling.
the cages may be formed of food grade plastic, which has no corrosion issues, is easily cleanable, has no food contamination issues, etc.

The floats of the present invention are advantageous because:
they hold the long lines apart by a precise and consistent distance along the entire length of the long lines.
they can be positioned relatively close together because they won't twist with respect to the long lines.
they can help to guide the floating platform along the longlines.
they are easy to lift and lower, with the tapered channels guiding the knots in the longlines towards their respective recesses. As such, operators do not need to be extremely precise when returning the oysters to the water.
the latch system is easy to operate, even when wearing gloves, and can provide confirmation that the float is appropriately positioned with respect to the knot on the longline.
the configuration of the floats can make it a quick and easy operation to slide one lot of oysters out, then another lot in, before lowering back into the water.
all components can be provided as plastic no corrosion issues.
as there is very little relative movement, wear of the floats by water action is reduced.

The floating platforms of the present invention are advantageous because:
they make it easier to work oysters more regularly, and by doing so reduce their growth time.
the floating platform can be kept working almost continually by rotating the portions in the manner described above.
they can make it much easier to work oysters due to features such as: automated lifting/lowering of oyster cages (which can be bigger because of their modular nature), the slidability of the cages along rails (which

- can be much easier/safer than manhandling the cages), easy to transfer from the floating platform to the grading system (mating rails), the users are working out of the water and hence can work in deeper water and do not have to lean out from the boat/barge (fewer WHS issues).
- the buoyancy system operates to keep the floating platform level, despite potentially having a large off-centre mass.
- the detachable portions make transferring the oysters to and from the land based grader much simpler and less work intensive.
- the platform cooperates with the floats to effectively line up the cages with the hoist/gantry with minimal operator input.
- it is possible to deploy graded oysters and collect ungraded oysters at the same time, resulting in a massive time saving. Furthermore, the oysters may be kept out of the water for a shorter time (which is important for Angasi oysters, for example).

It will be understood to persons skilled in the art of the invention that many modifications may be made without departing from the spirit and scope of the invention. All such modifications are intended to fall within the scope of the following claims.

It will be also understood that while the preceding description refers to specific sequences of method steps, pieces of apparatus and equipment and their configuration to perform such methods in relation to particular applications, such detail is provided for illustrative purposes only and is not intended to limit the scope of the present invention in any way.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A stackable cage for holding oysters and configured to depend from a float on an oyster long line, the stackable cage comprising:
    side walls comprising apertures for allowing a flow of water therethrough, at least one side wall being openable whilst the cage is stacked,
    an upper portion of the stackable cage being adapted to slidably receive an upper cage thereat; a lower portion of the stackable cage being adapted to slidably receive a lower cage thereat;
    wherein the upper portion of the stackable cage further comprises a channel or a complementary rail and the lower portion of the stackable cage further comprises either a complementary rail or a channel, respectively;
    a cap adapted to be slidably received on an open top of an uppermost stackable cage as a lid for the uppermost stackable cage, the cap comprising a flat rectangular panel and a handle;
    the handle having rigid portions angled upward from opposite sides of the cap directly above a channel or complimentary rail and converging at an uppermost portion of the handle;
    the uppermost portion of the handle comprising a circular rod centrally located above an upper surface of the flat rectangular panel and shaped to be slidably received in a float on an oyster long line;
    wherein the circular rod is configured to create a degree of rotational movement between the float and the cap to mitigate effects of tidal surges.

2. The stackable cage of claim 1, wherein the channel and rail extend for substantially the entire length of the stackable cage.

3. The stackable cage of claim 1, wherein the stackable cage comprises a base and upright sides, whereby a base of an upper cage defines a lid of the stackable cage.

4. The stackable cage of claim 1, wherein the stackable cage is formable from a flat material.

5. The stackable cage of claim 1, wherein the stackable cage is a rectangular prism in shape.

6. The stackable cage of claim 1, wherein the stackable cage is adapted to depend from the float in manner whereby that prevents snagging between the stackable cage and the oyster long line when lifting the float from the water.

7. The stackable cage of claim 1, wherein the float is elongate and adapted to engage a plurality of oyster long lines, the float further comprising spaced apart channels adapted to receive the plurality of long lines therein, at least one of the channels comprising a recess adapted to retain therein a bulbous portion provided on at least one of the long lines.

8. The stackable cage of claim 1, wherein the float is configured to be received between first and second hulls of a floating platform for deploying and retrieving the stackable oyster cages on a long line, the floating platform comprising:
    a first portion comprising a first water contacting hull;
    a second portion comprising a second water contacting hull; the second portion being detachably connected to the first portion; and
    a lifter for lifting and lowering oyster cages,
    wherein a buoyancy of the first portion and a buoyancy of the second portion are independently adjustable in response to a weight distribution over the floating platform.

* * * * *